Jan. 4, 1966           R. E. HARTSOCK         3,226,991
INDEXING DEVICE FOR A ROTARY SNAP SWITCH
Filed Dec. 17, 1962
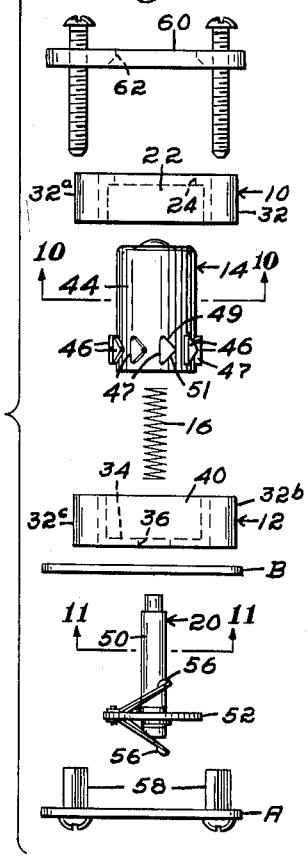
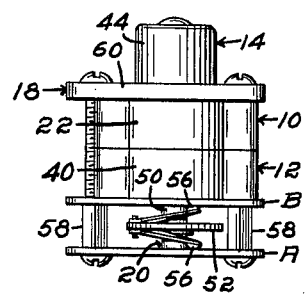
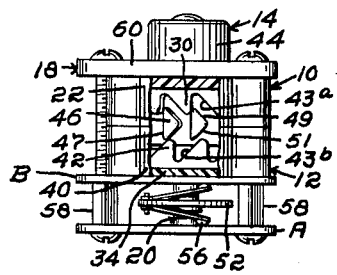
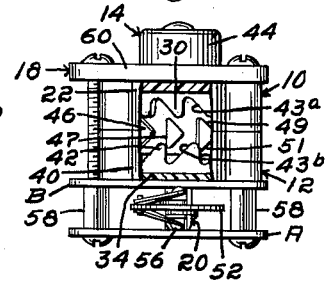
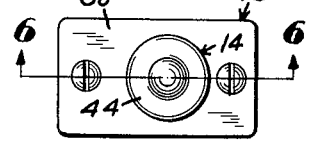
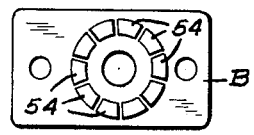
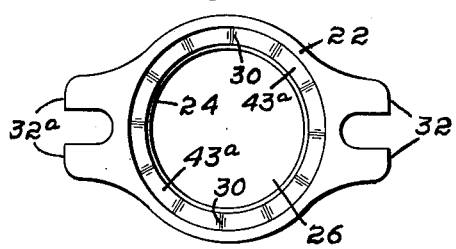
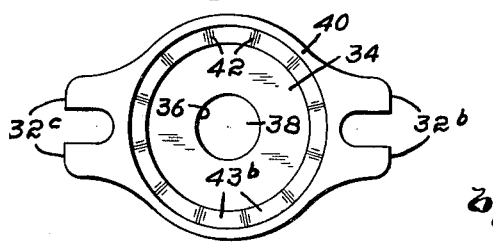
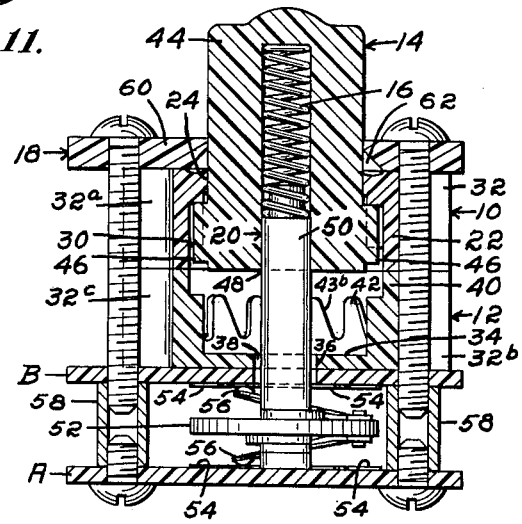
Inventor:
Robert E. Hartsock,
by Gordon Yeelleman
Atty.

United States Patent Office 3,226,991
Patented Jan. 4, 1966

3,226,991
INDEXING DEVICE FOR A ROTARY
SNAP SWITCH
Robert E. Hartsock, La Habra, Calif., assignor to United-Carr Fastener Corporation, Cambridge, Mass., a corporation of Delaware
Filed Dec. 17, 1962, Ser. No. 245,314
1 Claim. (Cl. 74—161)

This device relates generally to switches and more specifically to an indexing device for use with switches or other rotating members.

An object of the present invention is to provide an indexing device for converting axial motion into rotary motion.

A further object of the invention is to translate a linear motion into an indexed rotation of the rotating member.

Another object of the present invention is to provide the combination of an indexing device and a rotary contact for engagement with printed circuitry to produce a switching action.

Other objects will, in part, be obvious and will, in part, appear hereinafter.

An early method for converting longitudinal reciprocation of a push button to a step rotation of a rotating member was the use of a spring combined with a spiral member or screw. Another method of performing this function was to have a pawl engageable with one of the teeth of a rotor. Another means of accomplishing the same result is by having one of the ratchets spring loaded and bearing against another ratchet which is movable along the axis of the first ratchet, the cam piece of the second operating as stop means to prevent rotation of the spring loaded ratchet until it is moved in some way to allow partial rotary motion to take place in the first ratchet. Broadly speaking, the applicant's device utilizes counter torques which are produced by the teeth of the upper and lower ratchet members in combination with the teeth of the plunger.

In the drawings:
FIG. 1 is a side elevation of the assembly exploded;
FIG. 2 is a side elevation of the assembly;
FIG. 3 is a side elevation of the assembly shown in FIG. 2 with the outer case broken away to show the studs, the plunger being shown partially depressed;
FIG. 4 is a side elevation of the assembly shown in FIG. 2 with the outer case broken away showing the plunger partially returned after a complete down stroke;
FIG. 5 is a top plan view of the assembly shown in FIG. 2;
FIG. 6 is a section taken on lines 6—6 of FIG. 5;
FIG. 7 is a bottom plan view of the upper ratchet plate;
FIG. 8 is a bottom plan view of the lower ratchet member;
FIG. 9 is a plan view of one of the printed circuit boards;
FIG. 10 is a section taken on line 10—10 of FIG. 1; and
FIG. 11 is a section taken on line 11—11 of FIG. 1.

In the drawings there is disclosed a switch mechanism which utilizes an embodiment of the applicant's indexing device. The indexing device comprises an upper ratchet member 10, a lower ratchet member 12, a plunger 14, a compression spring 16, a frame 18 and a drive rod 20.

The upper ratchet member 10 comprises a circular wall 22; a narrow flange 24 extends inwardly from the circular wall 22 forming an opening at one end of the circular wall 22. The point of intersection of the circular wall 22 and the flange 24 provides the upper ratchet member 10 with a shoulder. A series of angular teeth 30 formed with their bases in integral relationship with the shoulder and in integral angular relationship with the circular wall 22. The apexes of the teeth 30 are pointed in a direction away from the opening 26 and are arced slightly to assist in the function of the teeth which will be explained hereinafter. Each of the teeth have the substantial geometric configuration of a right angle triangle with the hypotenuse 43a directed toward what may be considered a clockwise direction when looking at the teeth on side elevation with the flange uppermost. The hypotenuse of each of the teeth, it should be noted, face in a direction which may be considered away from the opening 26 in the upper ratchet member. A pair of arms 32 are formed in integral relationship with the outer surface of the circular wall 22 in spaced relation to each other and a similar pair of arms 32a are formed on the opposite external circular wall 22 from the first pair of arms 32 in a way which would place one arm of each in co-linear relationship.

The lower ratchet member comprises a base portion 34, which is generally circular in configuration and has an inner wall 36 forming an aperture 38 therethrough and an upstanding wall 40 formed in integral right angle relationship with the base portion 34 and extending therefrom. A series of lower teeth 42 are formed integral with the base portion 34 and with the upstanding wall 40 having the general configuration of a right angle triangle whose apexes are directed toward a plane away from the plane of said base portion 34. The hypotenuse 43b of each of the lower teeth 42, faces in the direction toward a plane away from the plane of said base portion 34. Two pairs of arms 32b and 32c are formed in integral relationship with the outer surface of the upstanding wall 40 in a manner similar to that of the pairs of arms 32 and 32a formed in the upper ratchet as set forth hereinbefore.

The plunger 14 comprises a cylindrical body portion 44 open at one end. A series of studs or rotor teeth 46 are formed on the external surface of the cylindrical body portion 44 proximate to the open end of the same. Each of the rotor teeth 46 have the configuration of an equilateral triangle whose base side 47 lies on a plane passing through the axis of the body portion 44 and whose apex is directed at right angles to the plane of the axis of the body portion 44. The opening 48 of the open end of the body portion 44 is continued as a longitudinal passage into the body portion 44. The side of each of the rotor teeth 46 directed toward the upper end of the plunger 14 will be referred to as the upper side 49 and the other side as the lower side 51.

The drive rod 20 comprises a rod element 50 having one terminal end formed to engage the compression spring 16 and the other end in the embodiment illustarted, having means of engaging a scanning plate 52. In order to prevent rotation of the plunger in relation to the drive rod 20, the opening 48 of the plunger 14 is formed with a pair of spaced parallel sides and the rod element 50 has two flat surfaces formed thereon to butt against the corresponding flat areas of the opening 48 thus preventing the rotation mentioned. The scanning plate 52 in the embodiment illustrated comprises a disc from which a pair of contacts 56 extend, one on each side of the disc and bend away from the disc to perform a function which will be more clearly set forth hereinafter.

In the embodiment shown the switch is mounted with a pair of printed circuit boards A and B. The two circuit boards are mounted in spaced parallel relationship as shown in FIG. 6. The two sides of the printed circuit boards A and B facing each other have a wheel of six contacts 54 which may be connected to the opposite side of their respected boards and complete circuits. Each of the fixed circuits are spaced from the six contacts adjacent it on each side as clearly shown in the drawings.

The circuit board B, in this case being uppermost, has an aperture formed therethrough through which the rod element 50 of the drive rod 20 extends. The lower ratchet 12 is then mounted on to the printed circuit board B on the opposite side from the fixed contacts 54 with its base portion 34 resting in superposed abutting relationship on the printed circuit board B. The drive rod 20 extends between the inner wall 36 of the aperture 38 formed in the base portion 34. The compression spring is now rested on the free terminal end provided for it on the drive rod 20. The plunger 14 is now placed into the assembly with the compression spring and a portion of the drive rod 20 passed into the passage formed in the cylindrical body portion 44 of the plunger 14. In this case the spring is not under compression and holds the rotor teeth 46 of the plunger 14 from engagement with the lower teeth 42 of the lower ratchet 12. The plunger 14 is now passed through the aperture 26 of the upper ratchet 10 with the edge of the circular wall 22 of the upper ratchet 10 directed toward the upstanding wall 40 of the lower ratchet 12. When this operation is completed, the edge of the circular wall 22 would be in superposed abutting relationship with the edge of the upstanding wall 40 and the arms 32 will be insuperposed abutting relationship with the arms 32b as will the arms 32a be in relation with the arms 32c. At this time the rotor teeth 46 will be in abutting relationship or meshed with the teeth 30 of the upper rachtet 10 and will be between the teeth 30 of the upper ratchet 10 and the lower teeth 42 of the lower ratchet 12. The circuit board A has engaged with a pair of internally threaded nuts 58 whose use will be explained hereinafter. The upper portion of the plunger 14 now extends beyond the top plane of the upper ratchet 12 and a framing plate 60 having an opening 62 is now placed into position with the plate in superposed abutting relationship with the upper ratchet 10 and the upper portion of the plunger 14 passing through the opening 62. The framing plate 60 also has a pair of holes spaced on each side of the framing plate so that a pair of screws can be passed through the openings and down between the arms of the upper ratchet and the lower ratchet and then into engagement with the nuts 58 to hold the total assembly together.

Prior to the axial pressure which will be applied to the plunger 14, the upper side 49 of each of the rotor teeth 46 is in abutting relationship with the hypotenuse of the teeth 30 of the upper ratchet 10. At the same time the base side 47 is in abutting relationship with the side of the next tooth to which the tooth having the concerned hypotenuse lies. As axial pressure is exerted on the plunger 14, the side abutting the base side 47 of the rotor teeth 46 is guided to the point where the lower side 51 of the rotor teeth 46 engages the hypotenuse of the lower teeth 42. As axial pressure is continued the rotor teeth 46 are guided along their lower sides 51 by the hypotenuse 43b of the lower teeth 42 to rotate the plunger and its attached rod element 50 in a rotary direction until the rotor teeth 46 bottom or the base side 47 engages the side of the lower teeth 42. If the plunger is now released, the plunger will return bringing the upper side 49 of the rotor teeth 46 into engagement with the hypotenuse 43a of the teeth 30 and again this will guide the plunger 14 and its accompanying rod element 50 in another short rotary arc. Since the scanning plate 52 is fixed to the rod element 50, the scanning plate is also turning and the contacts 56 engage different fixed contacts 54 on each complete up and down stroke of the plunger. If necessary the fixed contacts 54 could be reduced in size so that engagement may be made on both the up and the down stroke with different fixed contacts.

While there has been illustrated and described a preferred embodiment of the invention, the invention is best defined by the following claim.

I claim:

An indexing device comprising first and second ratchet members, each of said ratchet members comprising a base portion, a wall extending in integral relationship from said base portion said wall having a terminal edge and an inner surface, said inner surface having a series of teeth extending therefrom, around the circumference defined by said inner surface, each of said teeth having a crest directed toward the plane on which said terminal edge lies, said first ratchet member having an aperture formed centrally in said base portion, a plunger comprising a cylindrical body portion having a first end and a second end and a series of triangular studs spaced from each other around the periphery of said body portion and spaced from said second end, said first end of said body portion extending through said aperture formed in said first ratchet member, and said stud lying between the teeth of said first and second ratchet members and means holding said terminal edges of said first and second ratchet members in fixed abutting relationship with each other and said plunger rotatable in relation to said first and second ratchet members.

References Cited by the Examiner

UNITED STATES PATENTS

| 95,586 | 10/1869 | Henderson | 74—88 |
| 1,347,308 | 7/1920 | Thomas | 200—64 |
| 2,616,994 | 11/1952 | Luhn. | |
| 2,945,111 | 7/1960 | McCormick | 200—64 |

FOREIGN PATENTS

| 387,216 | 12/1923 | Germany. |
| 211,874 | 5/1924 | Great Britain. |

BROUGHTON G. DURHAM, *Primary Examiner.*

BERNARD A. GILHEANY, *Examiner.*